United States Patent
Chang et al.

(10) Patent No.: US 8,827,530 B2
(45) Date of Patent: Sep. 9, 2014

(54) LIGHT GUIDE PLATE AND BACKLIGHT ASSEMBLY HAVING THE SAME

(75) Inventors: Yi-Wen Chang, Hsin-Chu (TW); Fu-Cheng Fan, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 170 days.

(21) Appl. No.: 13/423,356

(22) Filed: Mar. 19, 2012

(65) Prior Publication Data

US 2013/0044514 A1 Feb. 21, 2013

(30) Foreign Application Priority Data

Aug. 17, 2011 (TW) ............................. 100129434 A
Nov. 18, 2011 (TW) ............................. 100142381 A

(51) Int. Cl.
*F21V 7/04* (2006.01)

(52) U.S. Cl.
CPC ............ *G02B 6/0028* (2013.01); *G02B 6/0016* (2013.01); *G02B 6/0011* (2013.01); *G02B 6/0018* (2013.01)
USPC ............................. 362/621; 362/608; 362/620

(58) Field of Classification Search
CPC .. G02B 6/0033; G02B 6/0035; G02B 6/0036; G02B 6/005; G02B 6/0011; G02B 6/0015; G02B 6/0016; G02B 6/0018
USPC ......... 362/608, 610, 615, 616, 617, 619, 620, 362/621, 628
See application file for complete search history.

(56) References Cited

U.S. PATENT DOCUMENTS

| | | | |
|---|---|---|---|
| 7,697,813 B2 * | 4/2010 | Lee et al. | 362/619 |
| 8,167,474 B2 | 5/2012 | Tanoue et al. | |
| 2005/0002174 A1 * | 1/2005 | Min et al. | 362/617 |
| 2007/0223251 A1 * | 9/2007 | Liao | 362/615 |
| 2008/0043171 A1 | 2/2008 | Takahashi et al. | |
| 2009/0033832 A1 * | 2/2009 | Pai | 362/628 |
| 2010/0002466 A1 * | 1/2010 | Kim et al. | 362/615 |

FOREIGN PATENT DOCUMENTS

| | | |
|---|---|---|
| CN | 101126867 A | 2/2008 |
| CN | 101614342 A | 12/2009 |
| TW | 201017286 | 5/2010 |
| WO | 2010070821 | 6/2010 |

* cited by examiner

*Primary Examiner* — Y M Lee
(74) *Attorney, Agent, or Firm* — WPAT, PC; Justin King

(57) ABSTRACT

A light guide plate includes a main body portion and inclined light guide portions having at least one recess. The main body portion has a first light incident surface, a bottom surface that is adjacent to the first light incident surface, and a light emitting surface that is opposite to the bottom surface. The inclined light guide portions disposed on the main body portion have a second light incident surface and at least one inclined surface. The second light incident surface is connected to the first light incident surface of the main body portion. The inclined surface is connected to the light emitting surface of the main body portion. At least one recess is formed between the inclined light guide portions. In addition, a wedge-shaped body can further be formed between the main body portion and the inclined light guide portions.

33 Claims, 10 Drawing Sheets

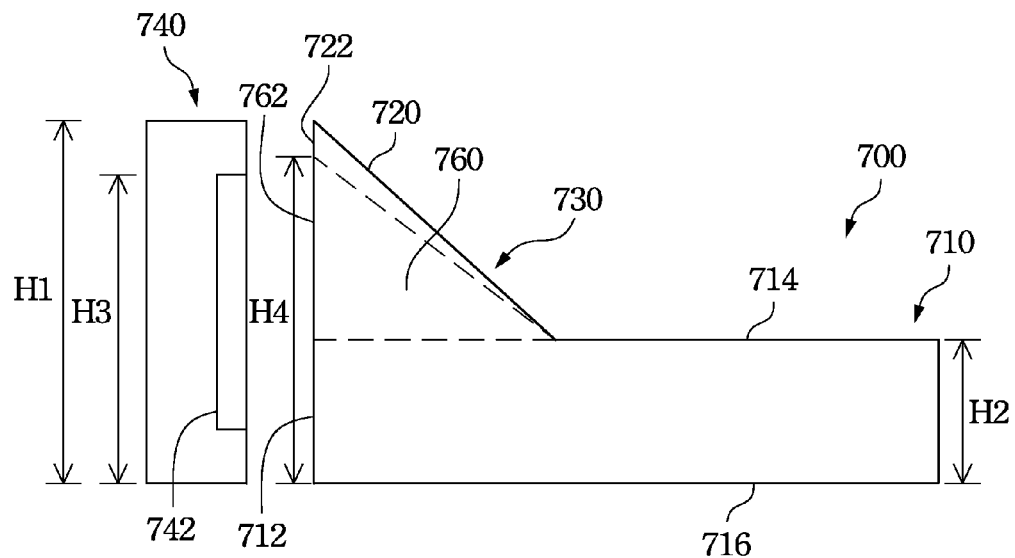
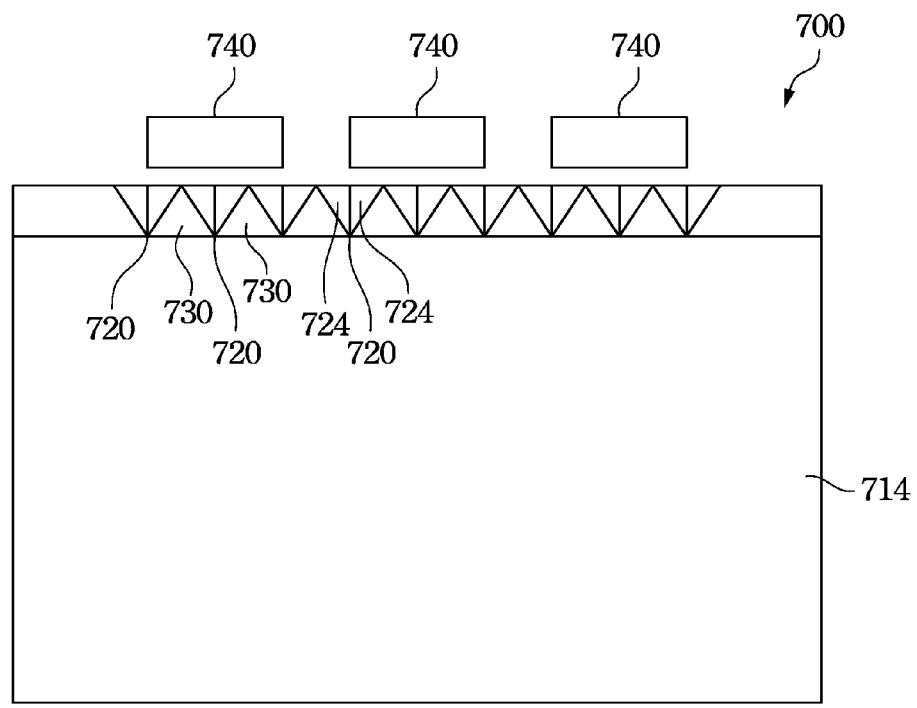
Fig. 7a
Fig. 7b

LIGHT GUIDE PLATE AND BACKLIGHT ASSEMBLY HAVING THE SAME

RELATED APPLICATIONS

This application claims priority to Taiwan Application Serial Number 100129434, filed Aug. 17, 2011 and 100142381, filed Nov. 18, 2011, which are herein incorporated by reference.

BACKGROUND

1. Field of Invention

The present invention relates to a light guide plate and a backlight assembly having the same. More particularly, the present invention relates to a light guide plate having a recess and inclined light guide portions, and a backlight assembly having the same.

2. Description of Related Art

In general, a Liquid Crystal Display (LCD) device includes an LCD panel and a backlight assembly. The LCD panel includes a Thin Film Transistor (TFT) substrate, a Color Filter (CF) substrate, and a liquid crystal layer disposed between the two substrates. The backlight assembly provides light to the LCD panel so that images can be displayed.

The light guide plate is an important component in the backlight assembly, and its main function is to guide the light generated by a point light source, such as a light-emitting diode, or a linear light source, such as a cold cathode fluorescent lamp, through a plate body and then emit the light from a planar surface. By this way, the luminance and the brightness uniformity of the display panel are enhanced. More specifically, the light guide plate is normally a rectangular plate structure, and includes a light incident surface, a reflection surface that is perpendicular to the light incident surface, a light emitting surface that is parallel to the reflection surface, and a few other lateral surfaces. A light source is disposed adjacent to the light incident surface. The light generated by the light source enters the light guide plate from the light incident surface, and then travels within the plate as long as the condition for total internal reflection exists. When the light strikes on the micro structures formed on the reflection surface, the condition for total internal reflection no longer exists and the light exits the light guide plate from the light emitting surface. The emitted light can then be used by the LCD panel to display images.

As more LCD devices are implemented in a variety of electronic product applications and the consumer demands for lighter and slimmer electronic products are growing strongly, it is inevitable that a thinner light guide plate design is much needed. A wedge-shaped light guide plate emerges as a response to that. The wedge-shaped light guide plate includes a light incident surface, a reflection surface that is perpendicular to the light incident surface, a light emitting surface that is parallel to the reflection surface, an inclined surface that connects the light emitting surface and the light incident surface, and a few other lateral surfaces. The portion of the wedge-shaped light guide plate (light incident surface) adjacent to the light source is the thickest part of the whole plate, with a thickness approximately equal to that of the light source. The thickness of the plate decreases as the distance from the light incident surface increases. This thickness-decreasing portion of the plate defines an inclined surface.

However, after entering the light incident surface of the wedge-shaped light guide plate, the light tends to leak out from the inclined surface before traveling to the light emitting region. As a result, the light efficiency of the backlight assembly is deteriorated. Moreover, display defects such as hot spots are likely to occur as well, thus lowering the display quality of the LCD device.

SUMMARY

One objective of the present invention is to provide a light guide plate to to increase the light efficiency and to reduce the number of hot spots, thereby increasing the luminance and enhancing the quality of a display panel.

Another objective of the present invention is to provide a light guide plate having a horizontal connecting portion for further increasing the light efficiency and reducing the number of hot spots, thereby further increasing the luminance and enhancing the quality of the display panel.

In one aspect of the invention, a light guide plate includes a main body portion and inclined light guide portions having at least one recess. The main body portion has a first light incident surface, a bottom surface that is adjacent to the first light incident surface, and a light emitting surface that is opposite to the bottom surface. The inclined light guide portions are disposed on the main body portion and have a second light incident surface and an inclined surface. The second light incident surface is connected to the first light incident surface of the main body portion. The inclined surface is connected to the light emitting surface of the main body portion.

In one embodiment, the inclined light guide portions further includes an upper surface wherein one end of the upper surface is connected to the second light incident surface, and another end of the upper surface is connected to the inclined surface. The upper surface is parallel to the light emitting surface of the main body portion.

The shape of the aforementioned recess is selected from the group consisting of a V shape, an arc, a polygon and any combinations thereof. The recess includes a sidewall and a bottom portion, and an angle between the sidewall and the bottom portion is greater than or equal to 90 degrees. The to bottom portion is coplanar with the light emitting surface. An angle between the sidewall and a normal to the second light incident surface is about 10 degrees to 20 degrees.

According to another embodiment, the inclined light guide portions have a plurality of recesses of which every two adjacent recesses are spaced apart by a distance.

According to another embodiment, the inclined light guide portions have a plurality of recesses of which every two recesses arranged side-by-side form a group, and every two adjacent groups are spaced apart by a distance.

According to another embodiment, the inclined light guide portions has a plurality of recesses of which every three recesses arranged side-by-side form a group, and every two adjacent groups are spaced apart by a distance.

According to another embodiment, the inclined light guide portions have a plurality of recesses arranged side-by-side.

According to a still another embodiment, the light guide plate further includes a wedge-shaped light guide portion formed between the inclined light guide portions and the main body portion. The sum of the heights of the wedge-shaped light guide portion, the inclined light guide portions and the main body portion is approximately equal to a height of a light source. The sum of the heights of the wedge-shaped light guide portion and the main body portion is approximately equal to a height of a lighting portion of the light source. The inclined light guide portions are elevated higher than the lighting portion of the light source.

According to a still another embodiment, the light guide plate further includes a horizontal connecting portion for improving the manufacturing quality and efficiency of the light guide plate.

In another aspect of the invention, a backlight assembly includes a light source, an optical film set, a reflector, and the aforementioned light guide plate. The light source is disposed adjacent to the first light incident surface and the second light incident surface of the light guide plate. The optical film set is disposed adjacent to the light emitting surface of the main body portion of the light guide plate. The reflector is disposed adjacent to the bottom surface of the main body portion of the light guide plate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 3b is a cross-sectional view illustrating the recess taken along line A-A' in FIG. 3a;

FIG. 7a is a cross-sectional view of the third embodiment illustrated in FIG. 6;

FIG. 7b is a top view of the third embodiment illustrated in FIG. 6;

DETAILED DESCRIPTION

Figure 1:
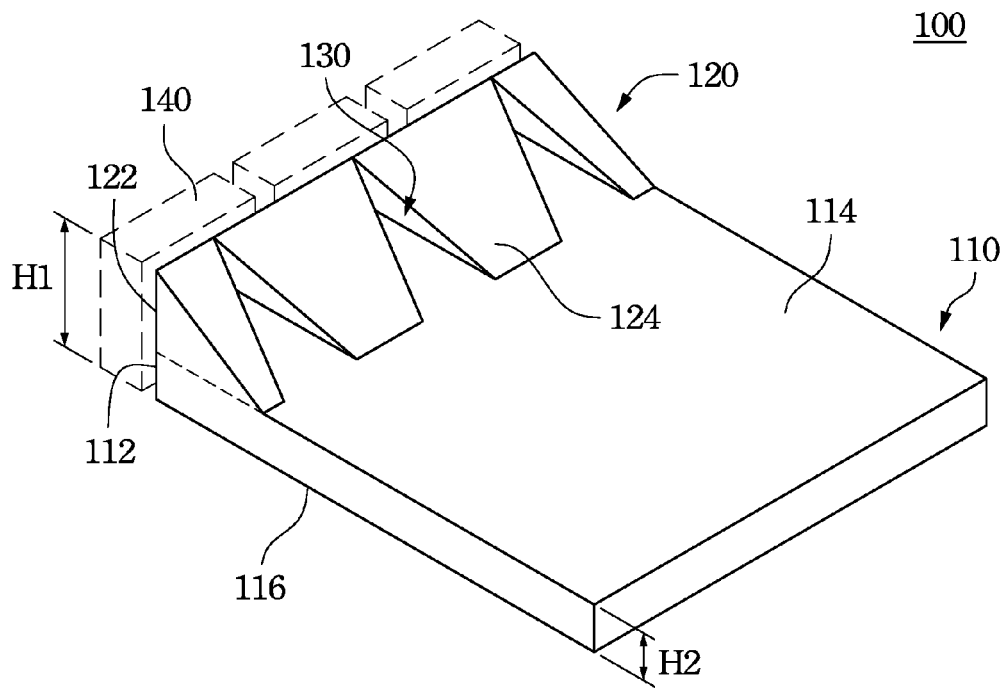
FIG. 1 is a perspective view illustrating a light guide plate according to a first embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a perspective view illustrating a light guide plate according to a first embodiment of the invention. A light guide plate 100 includes a main body portion 110 and inclined light guide portions 120. In addition, at least one recess 130 is formed between the inclined light guide portions 120. The main body portion 110 has a first light incident surface 112, a bottom surface 116, and a light emitting surface 114. The first light incident surface 112 faces toward a light source 140 and receives the light emitted by the light source 140. The light source 140 is exemplified by a point light source, such as a light emitting diode (LED) as shown in this embodiment. However, the light source 140 may also employ a linear light source, such a cold cathode fluorescent lamp (CCFL), or any other types of light sources. The bottom surface 116 is connected to the first light incident surface 112 in, for example, an orthogonal manner, and is used to reflect the light entering the first light incident surface 112. The light emitting surface 114 is located on the top side of the main body portion 110 and is disposed opposite to the bottom surface 116 in an approximately parallel manner. The light reflected from the bottom surface 116 exits the light guide plate 100 from the light emitting surface 114.

Inclined light guide portions 120, such as wedge-shaped light guide portions, are disposed above the main body portion 110, and have a second light incident surface 122 that is formed as an upward extension of the first light incident surface 112. Such a structure may be implemented by forming the inclined light guide portions 120 and the main body portion 110 integrally. Similar to the first light incident surface 112, the second light incident surface 122 faces toward the light source 140 and receives the light emitted by the light source 140. Moreover, the inclined light guide portions 120 has an inclined surface 124 of which one end is connected to a top edge of the second light incident surface 122 and another end is connected to the light emitting surface 114 of the main body portion 110. Such inclined light guide portions 120 have a cross-sectional shape of a right triangle.

In this embodiment, the side of the light guide plate 100 adjacent to the light source 140 has a first height (H1), which is defined as a sum of the heights of the first light incident surface 112 and the second light incident surface 122. The first height (H1) is approximately equal to the height of the light source 140. On the other hand, the side of the light guide plate 100 farthest away from the light source 140, i.e., an end portion of the light emitting surface 114, has a second height (H2), which is approximately equal to the distance between the bottom surface 116 and the light emitting surface 114. Therefore, the first height (H1) is greater than the second height (H2). In other words, the upward-extending inclined light guide portions 120 causes a height of the side of the light guide plate 100 adjacent to the light source 140 to be greater than that of the side of the light guide plate 100 farthest away from the light source 140, i.e., the end portion of the light emitting surface 114.

It is worthy to be noted that at least one V-shaped recess 130 is formed between the inclined light guide portions 120. The V-shaped recess has a vertex which is disposed adjacent to the edge on which the second light incident surface 122 meets the inclined surface 124, and an opening that faces toward the light emitting surface 114. Furthermore, the recess 130 is disposed above the main body portion 110, meaning that the depth of the recess 130 generally does not exceed below the interface (indicated by a dashed line in FIG. 1) between the inclined light guide portions 120 and the main body portion 110. Therefore, a bottom portion 334 of the recess (referring to FIG. 3b) may be coplanar with the light emitting surface 114 of the main body portion 110. The function of the recess 130 is to change the geometric shape of the inclined light guide portions 120, which in turn changes the light's traveling direction and angle therewithin. As a result, the recess 130 can improve the light guiding angle of the inclined light guide portions 120 to prevent the light from leaking out through the inclined surface 124 of the inclined light guide portions 120 due to the light guiding angle being smaller than the critical angle. Therefore, the light efficiency of the light guide plate is increased and the luminance of the display panel is enhanced. Moreover, the recess 130 is capable of reducing the number of hot spots, thereby improving the display quality.

Figure 2:
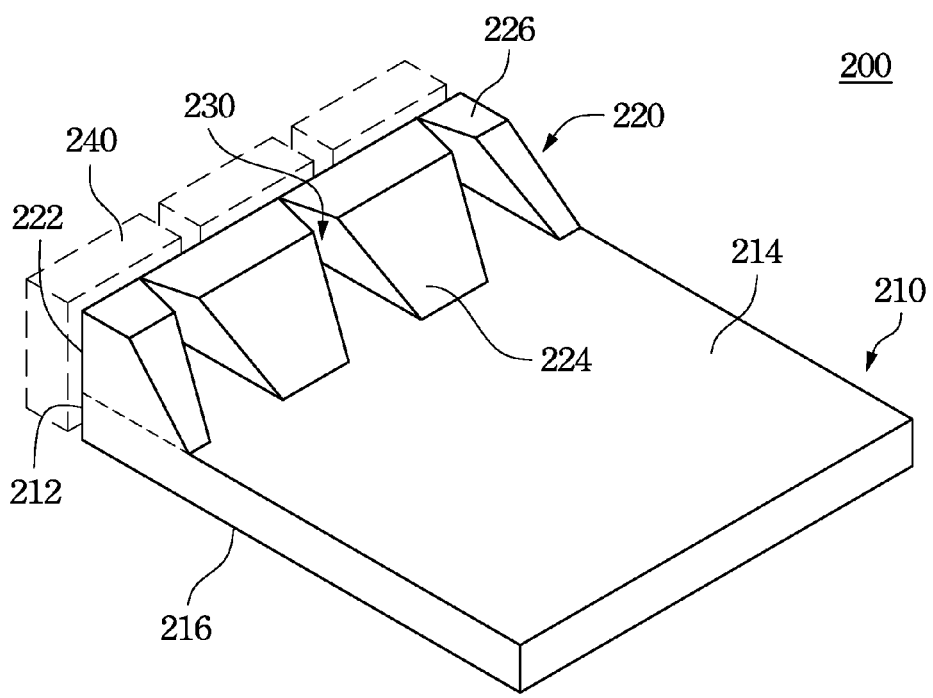
FIG. 2 is a perspective view illustrating a light guide plate according to a second embodiment of the invention.

FIG. 2 is a perspective view illustrating a light guide plate according to a second embodiment of the invention. The light guide plate 200 includes a main body portion 210 and inclined light guide portions 220 having at least one recess 230. The main body portion 210 has a first light incident surface 212, a bottom surface 216, and a light emitting surface 214. The functions and relationships of these surfaces are the same as those described in the first embodiment and will not be addressed again herein. The difference between the second embodiment and the first embodiment lies in the structure of the inclined light guide portions 220. In this embodiment, the inclined light guide portions 220 are disposed above the main body portion 210 and have a second light incident surface 222 that is formed as an upward extension of the first light incident surface 212. Such a structure may be implemented by forming the wedge-shape portion 220 and the main body portion 210 integrally. The inclined light guide portions 220 further have an upper surface 226 and an inclined surface 224. The upper surface 226 is parallel to the light emitting surface 214 of the main body portion 210, and one end of the upper surface 226 is connected to a top edge of the second light incident surface 222, and another end of the upper surface 226 is connected to a top edge of the inclined surface 224. A bottom edge of the inclined surface 224 is connected to the light emitting surface 214. Such inclined light guide portions 220 have a cross-sectional shape of a trapezoid.

Similar to the first embodiment, the light guide plate 200 of the second embodiment includes at least one recess 230 that is formed between the inclined light guide portions 200 and disposed above the main body portion 210.

Figure 3A:
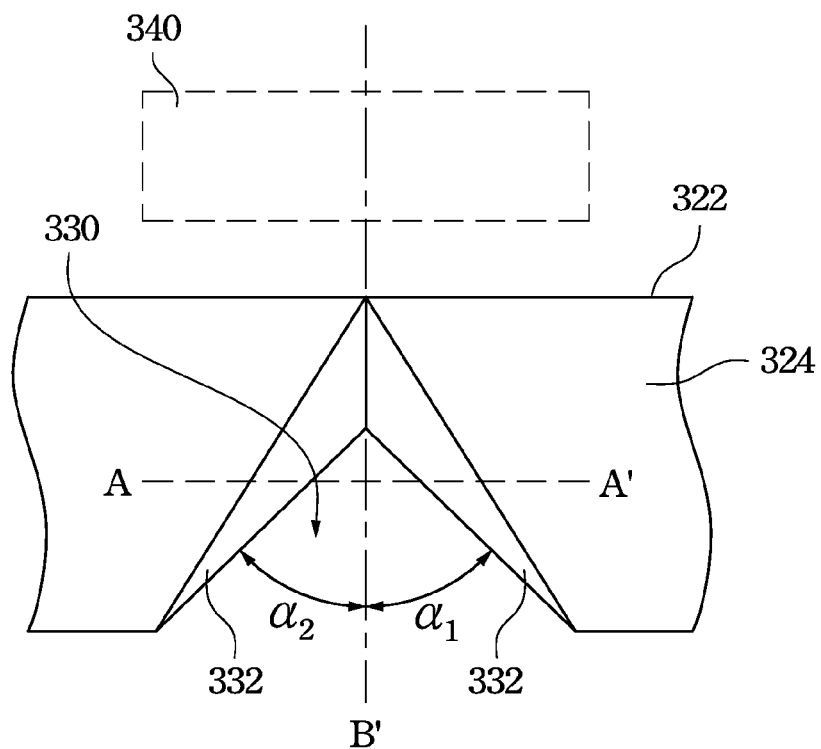
FIG. 3a is a top view illustrating a recess shown in FIG. 1.
Figure 3B:
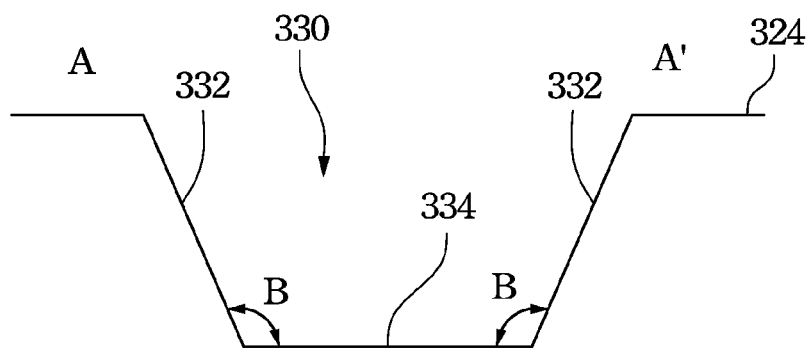

The geometric shape of the recess has a substantial effect on the efficiency of the light guide plate. FIG. 3a is a top view illustrating the recess shown in FIG. 1. FIG. 3b is a cross-sectional view illustrating the recess taken alone line A-A' in FIG. 3a. Referring to FIGS. 3a and 3b, the V-shaped recess 330 is preferably formed corresponding to the position of the light source 340. The recess 330 includes two sidewalls 332 and a bottom portion 334. An upper edge of the sidewall 332 is connected to the inclined surface 324 and a lower edge of the sidewall 332 is connected to the bottom portion 334. The angle B between the sidewall 332 and the bottom portion 334 is preferably greater than or equal to 90 degrees, such that the light can be effectively prevented from leaking from the inclined surface 324. In addition, a vertically-extending dashed line passing through the center of the light source 340 and the vertex of the V-shaped recess 330 in FIG. 3a is defined as a normal B' to the second light incident surface 322. An angle of $\alpha_1$ is formed between the normal B' and one of the sidewalls 332. An angle of $\alpha_2$ is formed between the normal B' and the other sidewall 332. The value of the angle ($\alpha_1$ or $\alpha_2$) determines the efficiency of the light guide plate. The experimental data shows that the light efficiency of the light guide plate increases as the value of the angle ($\alpha_1$ or $\alpha_2$) increases. An optimal range of light efficiency is achieved when the angle is between 10 degrees to 20 degrees. When the angle is 15 degrees, the light efficiency reaches the maximum. Therefore, the angle ($\alpha_1$ or $\alpha_2$) between the normal B' of the second light incident surface 322 and the sidewall 332 of the recess 330 is preferably set in the range of 10 degrees to 20 degrees. The value of $\alpha_1$ may be equal to that of $\alpha_2$, and thus the resulting shape of the recess is an equilateral V shape. Alternatively, the value of $\alpha_1$ may not be equal to that of $\alpha_2$, and thus the resulting shape of the recess is a lopsided V shape.

Figure 4A:
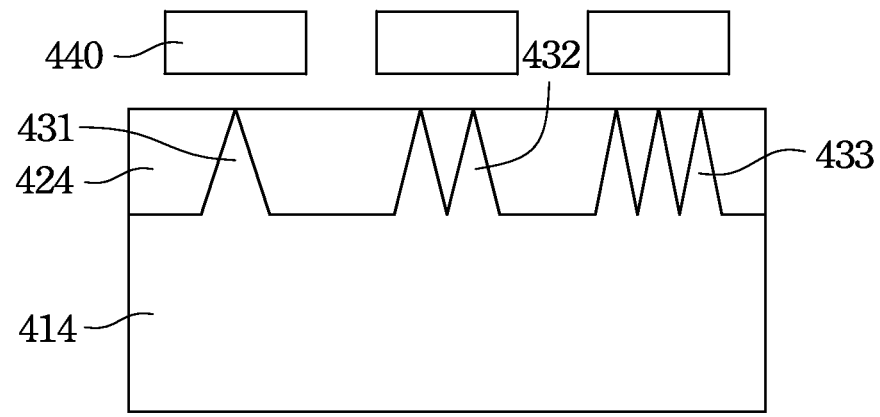
FIG. 4a is a top view of the light guide plate illustrating different to arrangements of the recesses.
Figure 4B:
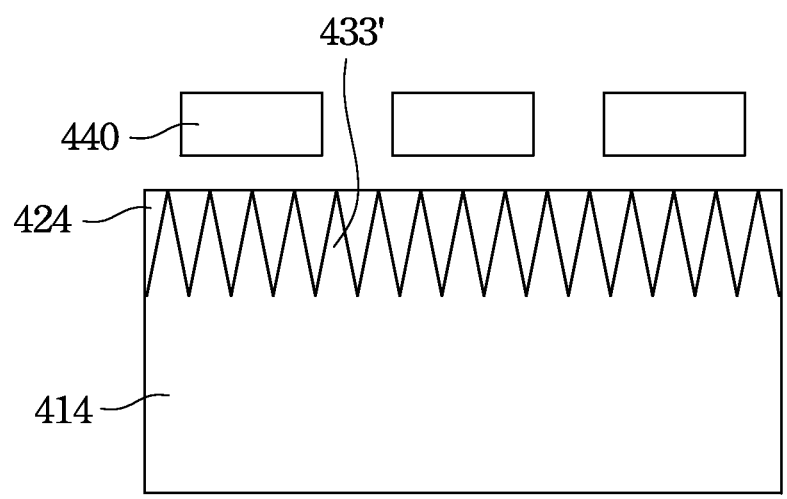
FIG. 4b is a top view of the light guide plate illustrating the recesses arranged side-by-side across the entire light guide plate.
Figure 4C:
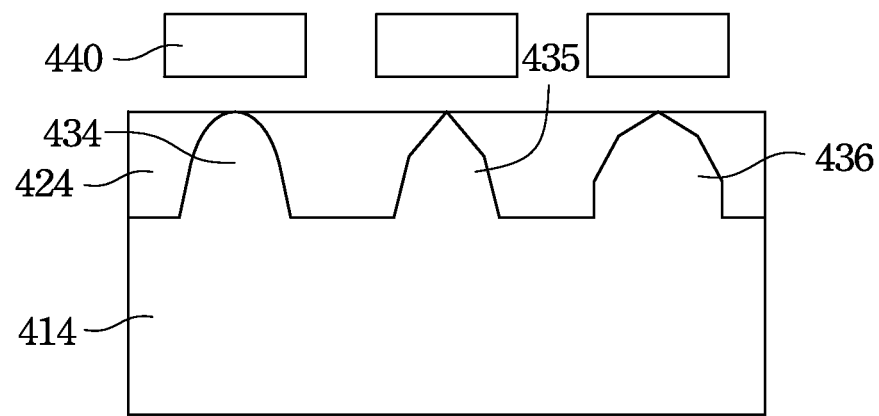
FIG. 4c is a top view of the light guide plate illustrating different shapes of the recesses.

Furthermore, the arrangement of the recesses can influence the performance of the light guide plate. FIG. 4a is a top view of the light guide plate illustrating different arrangements of the recesses. As shown in FIG. 4a, the recess 431 may be corresponding to the light source 440 in a one-to-one arrangement, meaning that each recess 431 is formed between the inclined surface 424 of the inclined light guide portions at a position corresponding to one light source 440 and is spaced apart by a distance to the next immediately-adjacent recess. In addition, the recess may be corresponding to the light source 440 in a multiple-to-one arrangement. For example, two recesses 432 formed side-by-side are corresponding to one light source 440, or three recesses 433 formed side-by-side are corresponding to one light source 440. Furthermore, a plurality of recesses 433' may be continuously formed side-by-side, as shown in FIG. 4b. The experimental data shows that a plurality of recesses arranged side-by-side (e.g., recesses 432, 433, and 433') can result in a light guide plate of a higher light efficiency and a less number of hot spots than a single recess arrangement (e.g., recess 431) can. In addition, the projection of the recess on the main body portion is not limited to a V shape. As shown in FIG. 4c, an arc-shaped recess 434 or a polygonal-shaped recess (435 or 436) may also be formed by using different process tools.

Figure 4D:
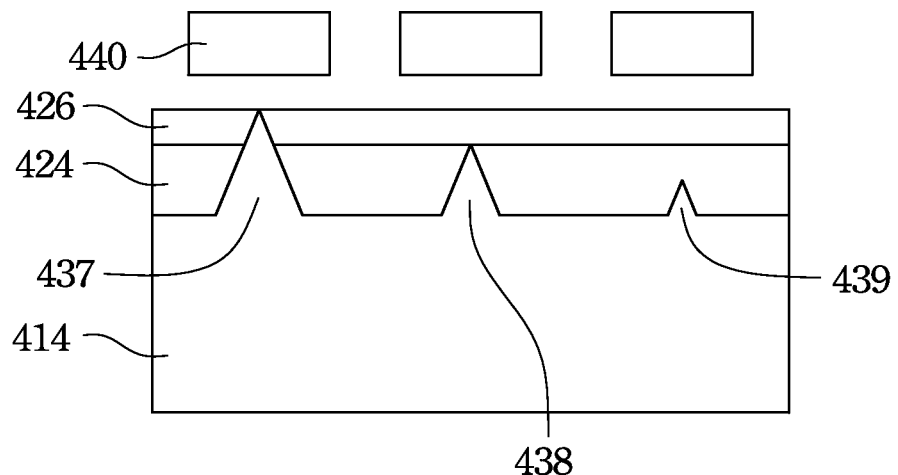
FIG. 4d is a top view of the light guide plate illustrating different sizes of the recesses.

The size of the recess may be adjusted depending on different optical requirements of the light guide plate. As shown in FIG. 4d, the edge length of the V-shaped recess 437 is the longest of all the recesses. The vertex of the recess 437 is adjacent to the boundary between the upper surface 426 and the light incident surface, thus resulting in a wider opening of the recess. In addition, the recess 438 may be made smaller by placing the vertex of the recess 438 proximate to the boundary between the upper surface 426 and the inclined surface 424 without extending to the upper surface 426. Furthermore, the recess 439 may be made even smaller by placing the vertex of the recess 439 on the inclined surface 424, thus resulting a relatively narrower opening of the recess.

Figure 5:
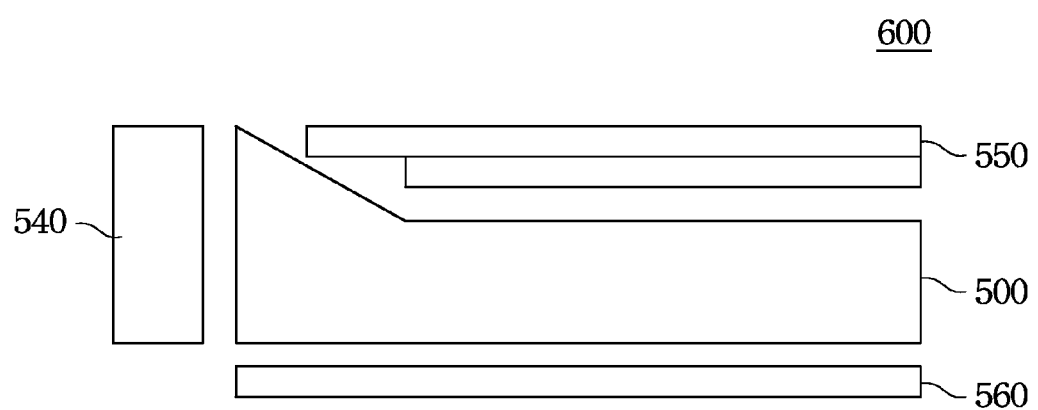
FIG. 5 is a cross-sectional view of a backlight assembly of the invention.

The aforementioned light guide plate having the recesses may be implemented in a backlight assembly in order to provide the required light output to the display panel. As shown in FIG. 5, the backlight assembly 600 includes a light guide plate 500 having the recesses (not shown), a light source 540, a reflector 560, and an optical film set 550. The light source 540 may be selected from a point light source, such as an LED, a linear light source, such as a CCFL, or any other types of light source, and is disposed adjacent to the first light incident surface and the second light incident surface of the light guide plate 500. The reflector 560 is disposed adjacent to the bottom surface of the light guide plate 500. The reflector 560 is used to reflect the light that leaks from the bottom surface, such that the leaking light can be re-introduced into the light guide plate 500. The optical film set 550 is disposed adjacent to the light emitting surface of the light guide plate. The optical film set 550 includes one or more optical films, such as diffusers and prism sheets. As passing through the optical film set 550, the light is scattered and then collimated, thereby resulting in a uniform brightness light source for the display panel. Furthermore, the light guide plate having the unique recess structures is capable of improving the light efficiency and reducing the number of hot spots, such that the backlight assembly having the same is capable of generating a higher luminance. The overall quality of the liquid crystal device is enhanced altogether.

Figure 6:
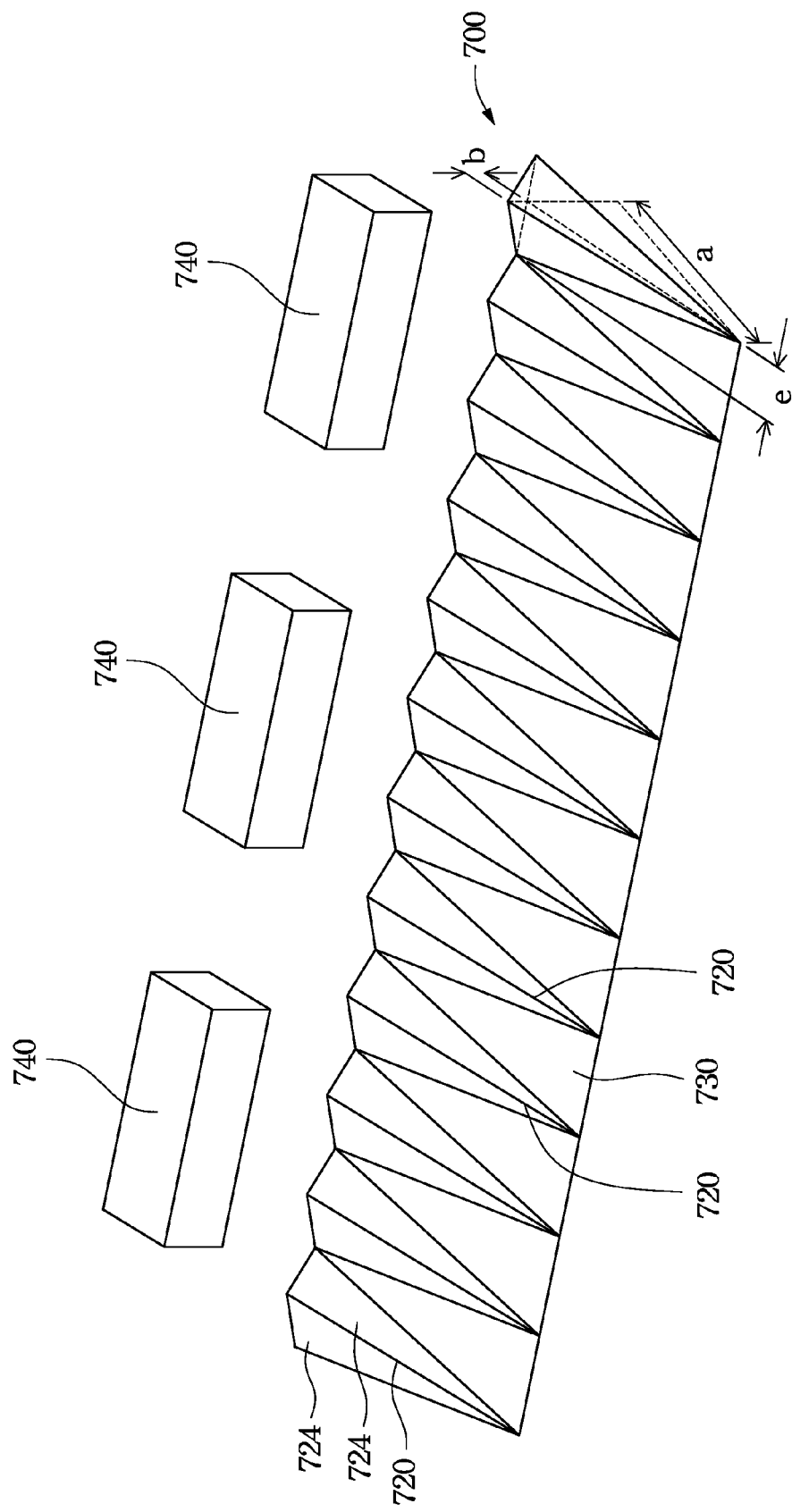
FIG. 6 is a perspective view illustrating a light guide plate according to a third embodiment of the invention.

Refer to FIGS. 6, 7a and 7b. FIG. 6 is a perspective view illustrating a light guide plate according to a third embodiment of the invention. FIG. 7a is a cross-sectional view of the third embodiment illustrated in FIG. 6, and FIG. 7b is a top view of the third embodiment illustrated in FIG. 6.

As shown in the FIGS. 6, 7a and 7b, a light guide plate 700 includes a main body portion 710 and a plurality of inclined light guide portions 720 and a wedge-shaped light guide portion 760 formed between the main body portion 710 and the inclined light guide portions 720.

In addition, the main body portion 710 has a first light incident surface 712, a bottom surface 716, and a light emitting surface 714. The functions and relationships of these surfaces are the same as those described in the first embodiments and will not be addressed again herein. The difference between the third embodiment and the first embodiment lies in the structure that the wedge-shaped light guide portion 760 is formed between the main body portion 710 and the inclined light guide portions 720. That is, the inclined light guide portions 720 is formed on the wedge-shaped light guide portion 760 to effectively increase the light efficiency of the light guide plate and reduce the number of hot spots.

As shown in the FIGS. 6, 7a and 7b, each of the inclined light guide portions 720 has two inclined surface 724, and one end of each inclined surface 724 is connected together and another end thereof is connected to the wedge-shaped light guide portion 760 under the inclined light guide portion 720. The inclined surfaces 724 and the wedge-shaped light guide portion 760 under the inclined light guide portions 720 can cooperatively connect to the light emitting surface 714 of the main body portion 710.

The wedge-shaped light guide portion 760 has a second light incident surface 762 that is formed as an upward extension of the first light incident surface 712 of the main body portion 710. The inclined light guide portions 720 include a first end surface 722 that is formed as an upward extension of the second light incident surface 762. Generally, such a structure may be implemented by forming the inclined light guide portions 720, the wedge-shaped light guide portion 760 and the main body portion 710 integrally.

Recesses 730 are formed between the adjacent inclined light guide portions 720, and the recesses 730 are formed above the wedge-shaped light guide portion 760 to avoid influencing the light transmission in the wedge-shaped light guide portion 760. The recesses 730 can be V-shaped recesses as shown in FIG. 7b. Alternatively, the recesses 730 can be arc-shaped recesses or polygonal-shaped recesses as shown in the FIG. 4c while the connection shape of the inclined surface 724 and the wedge-shaped light guide portion 760 is changed.

For example, referring to the V-shaped recesses shown in FIG. 6, the length of the inclined light guide portions 720 is about 1.5 millimeters (mm), and a half width e of the recess is about 0.1 mm to 1.0 mm. In addition, the height b of the inclined light guide portions 720 is about 0.01 mm to 0.1 mm and can be further extended higher than 0.1 mm, for example, higher than 0.15 mm, to increase the light efficiency of the light guide plate. Please refer to FIG. 10. The relationship between the height of the VotexUP and the light efficiency of the light guide plate is illustrated.

In addition, the inclined light guide portions 720 can be continuously formed on the wedge-shaped light guide portion 760, wherein every two inclined light guide portions 720 arranged side-by-side form a group, and every two adjacent groups are spaced apart by a distance; or every three inclined light guide portions 720 arranged side-by-side form a group, and every two adjacent groups are spaced apart by a distance to effectively increase the light efficiency of the light guide plate and reduce the number of hot spots.

In this embodiment, the side of the light guide plate 700 adjacent to the light source 740 has a first height (H1), which is defined as a sum of the heights of the first light incident surface 712, the second light incident surface 762 and the first end surface 722. The first height (H1) is approximately equal to the height of the light source 740. On the other hand, the side of the light guide plate 700 farthest away from the light source 740, i.e., an end portion of the light emitting surface 714, has a second height (H2), which is approximately equal to the distance between the bottom surface 716 and the light emitting surface 714.

Therefore, the first height (H1) is greater than the second height (H2). In other words, the upward-extending portions of the wedge-shaped light guide portion 760 and the inclined light guide portions 720 cause a height of the side of the light guide plate 700 adjacent to the light source 740 to be greater than that of the side of the light guide plate 700 farthest away from the light source 740, i.e., the end portion of the light emitting surface 714.

It is worthy to be noted that the light source 740 includes a lighting portion 742. The height of the lighting portion 742 is defined as a third height (H3), and the sum of the heights of the first light incident surface 712 and the second light incident surface 762 is defined as a fourth height (H4). In one embodiment, the fourth height (H4) is equal to the third height (H3), that is, the height of the lighting portion 742 is equal to the heights of the first light incident surface 712 and the second light incident surface 762. In addition, the first end surface 722 is preferably elevated higher than the lighting portion 742 of the light source 740.

By way of the inclined light guide portions 720 elevated higher than the lighting portion 742 of the light source 740, the light efficiency of the light guide plate is effectively increased and the number of hot spots is reduced.

Figure 8:
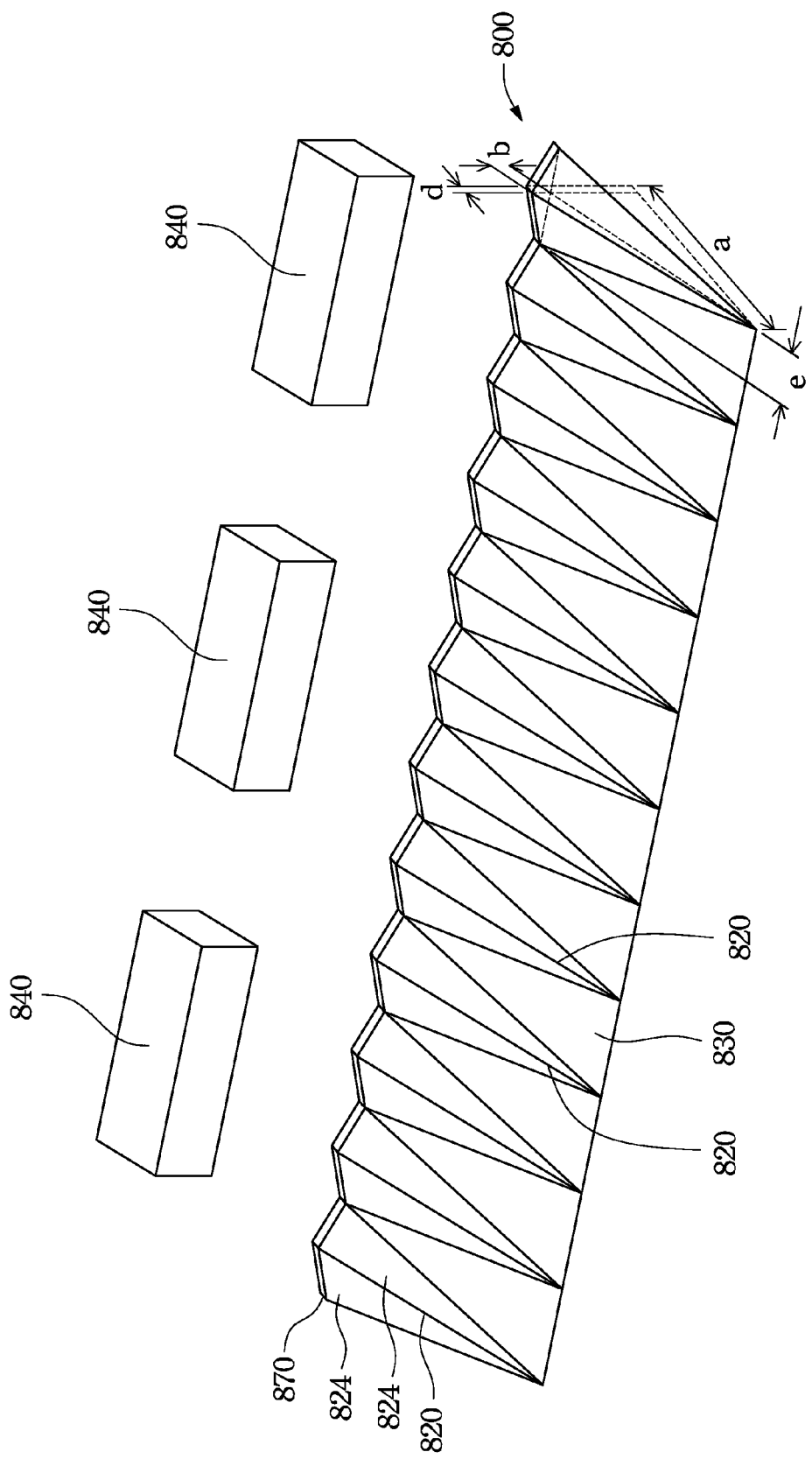
FIG. 8 is a perspective view illustrating a light guide plate according to a fourth embodiment of the invention.
Figure 9A:
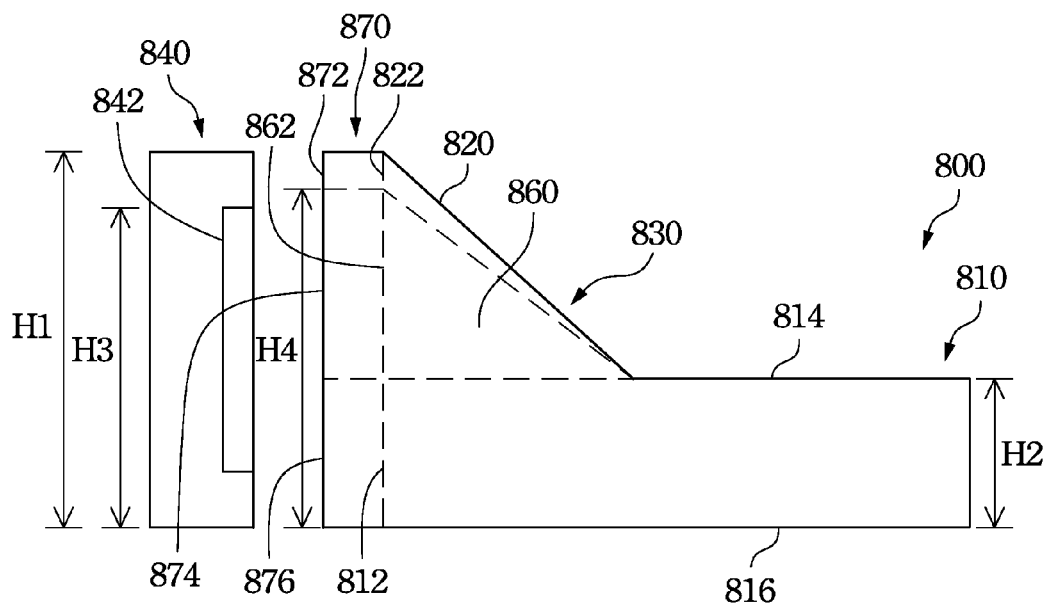
FIG. 9a is a cross-sectional view of the fourth embodiment illustrated in FIG. 8.
Figure 9B:
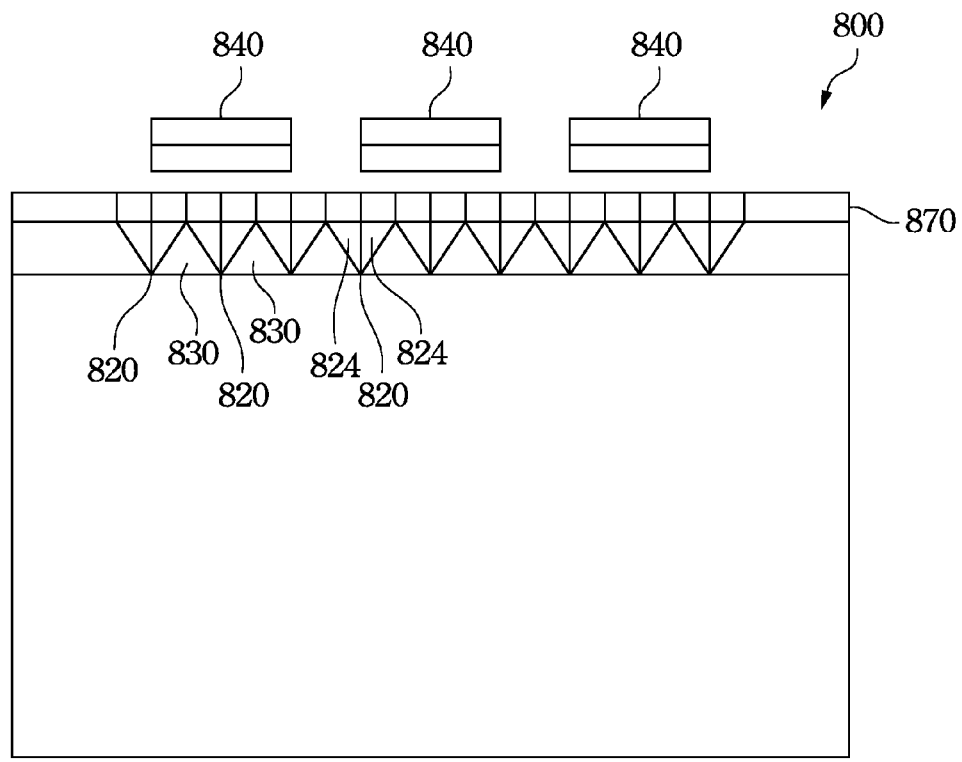
FIG. 9b is a top view of the fourth embodiment illustrated in FIG. 8.

Refer to FIGS. 8, 9a and 9b. FIG. 8 is a perspective view illustrating a light guide plate according to a fourth embodiment of the invention. FIG. 9a is a cross-sectional view of the fourth embodiment illustrated in FIG. 8 and FIG. 9b is a top view of the fourth embodiment illustrated in FIG. 8.

As shown in the FIGS. 8, 9a and 9b, a light guide plate 800 includes a main body portion 810 and a plurality of inclined light guide portions 820 and a wedge-shaped light guide portion 860 formed between the main body portion 810 and the inclined light guide portions 820.

In addition, the main body portion 810 has a first light incident surface 812, a bottom surface 816, and a light emitting surface 814. The functions and relationships of these surfaces are the same as those described in the third embodiment and are briefly described as follows.

As shown in the FIGS. 8, 9a and 9b, the inclined light guide portions 820 has a plurality of inclined surfaces, such as two inclined surface 824, and one end of each inclined surface 824 is connected together and another end thereof is connected to the wedge-shaped light guide portion 860 under the inclined light guide portions 820. The inclined surfaces 824 and the wedge-shaped light guide portion 860 under the inclined light guide portions 820 can cooperatively be connected to the light emitting surface 814 of the main body portion 810. Furthermore, such a structure may be implemented by forming the inclined light guide portions 820, the wedge-shaped light guide portion 860 and the main body portion 810 integrally.

Recesses 830 are formed between the inclined light guide portions 820, and the recesses 830 are formed above the wedge-shaped light guide portion 860 to avoid influencing the light transmission in the wedge-shaped light guide portion 860. The recesses 830 can be V-shaped recesses as shown in FIG. 9b. Alternatively, the recesses 830 can be arc-shaped recesses or polygonal-shaped recesses as shown in the FIG. 4c while the connection shape of the inclined surface 824 and the wedge-shaped light guide portion 860 is changed.

Figure 10:
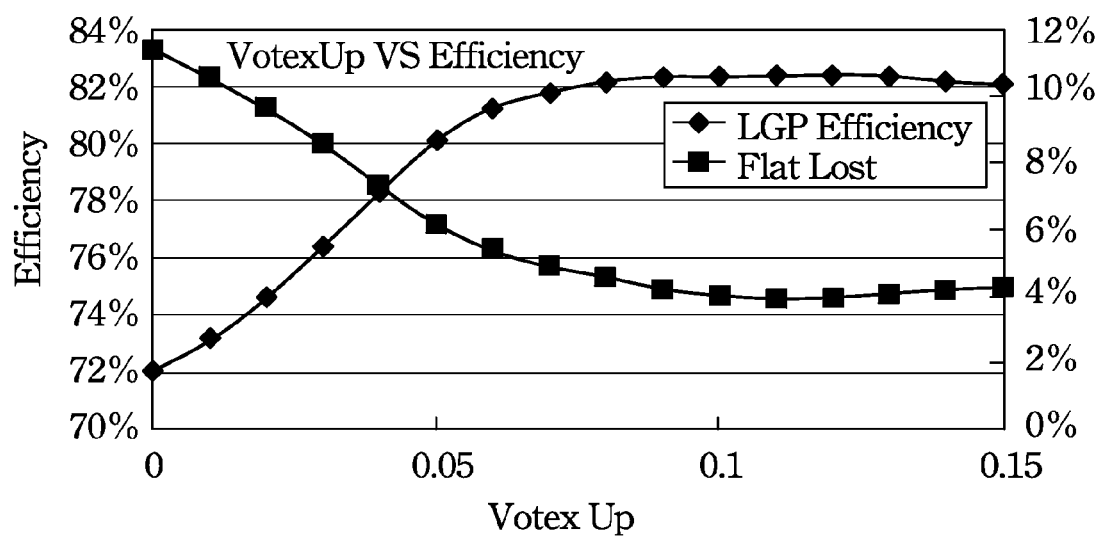
FIG. 10. illustrates a relationship between the height of the VotexUP and the light efficiency of the light guide plate.

For example, referring to the V-shaped recesses shown in FIG. 8, the length of the inclined light guide portions 820 is about 1.5 millimeters (mm), and a half width e of the recess is about 0.1 mm to 1.0 mm. In addition, the height b of the inclined light guide portions 820 is about 0.01 mm to 0.1 mm and can be further extended higher than 0.1 mm, for example, higher than 0.15 mm or more, to increase the light efficiency of the light guide plate. Refer to FIG. 10. The relationship between the height of the VotexUP and the light efficiency of the light guide plate are illustrated. In addition, a length d of a horizontal connecting portion 870 is smaller than 0.5 mm.

The inclined light guide portions 820 can be continuously formed on the wedge-shaped light guide portion 860, and every two inclined light guide portions 820 arranged side-by-side form a group, and every two adjacent groups are spaced apart by a distance; or every three inclined light guide portions 820 arranged side-by-side form a group, and every two adjacent groups are spaced apart by a distance to effectively increase the light efficiency of the light guide plate and reduce the number of hot spots.

In this embodiment, the horizontal connecting portions 870 close to the light source 840 are extended from the inclined light guide portions 820, the main body portion 810 and the wedge-shaped light guide portion 860. That is to say, the first end surface 822 of the inclined light guide portions 820, the second light incident surface 862 of the wedge-shaped light guide portion 860 and the first light incident surface 812 of the main body portion 810 are respectively formed a first end surface extension 872, a second end surface to extension 874, and a first light incident surface extension 876.

Because the horizontal connecting portion 870 is horizontally extended from the inclined light guide portions 820, the main body portion 810 and the wedge-shaped light guide portion 860, the horizontal connecting portion 870 of the light guide plate 800 is perpendicular to the surface of the injection mold. Therefore, the male mold and the female mold for injecting molding the light guide plate can be more close to each other, such that the burr on the edge of the light guide plate can be effectively reduced. Hence, the subsequent artificial burr removal process can be reduced, and the light efficiency of the light guide plate is effectively increased and the number of hot spots is reduced.

In this embodiment, the side of the light guide plate 800 adjacent to the light source 840 has a first height (H1), which is defined as a sum of the heights of the first light incident surface 812, the second light incident surface 862 and the first end surface 822. The first height (H1) is approximately equal to the height of the light source 840, and is also approximately equal to a sum of the heights of the first end surface extension 872, the second end surface extension 874 and the first light incident surface extension 876.

The first height (H1) is greater than the second height (H2). The light source 840 includes a lighting portion 842. The height of the lighting portion 842 is defined as a third height (H3), and the sum of the heights of the first light incident surface 812 and the second light incident surface 862 is defined as a fourth height (H4), that is, equal to a sum of the heights of the first light incident surface extension 876 and the second end surface extension 874. In one embodiment, the fourth height (H4) is equal to the third height (H3), and the first end surface extension 872 is elevated higher than the lighting portion 842 of the light source 840.

In this embodiment, by way of the inclined light guide portions 820 elevated higher than the lighting portion 842 of the light source 840, the light efficiency of the light guide plate is effectively increased and the number of hot spots is reduced. The light guide plate 800 including the horizontal connecting portion 870 can reduce the burr formed on the edge of the light guide plate 800 such that the manufacturing quality of the light guide plate is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light guide plate, comprising:
   a main body portion having a first light incident surface, a bottom surface adjacent to the first light incident surface, and a light emitting surface opposite to the bottom surface;
   a plurality of inclined light guide portions disposed above the main body portion, each of the inclined light guide portions having a first end surface connected to the first light incident surface and an inclined surface connected to the light emitting surface of the main body portion, and at least one recess formed between the inclined light guide portions: and
   a wedge-shaped light guide portion formed between the inclined light guide portions and the main body portion, wherein the wedge-shaped light guide portion further comprises a second light incident surface between the first light incident surface and the first end surface.

2. The light guide plate of claim 1, wherein the inclined light guide portions further comprises an upper surface, and one end of the upper surface is connected to the first end surface, and another end of the upper surface is connected to the inclined surfaces.

3. The light guide plate of claim 2, wherein the upper surface is parallel to the light emitting surface of the main body portion.

4. The light guide plate of claim 1, wherein a shape of the at least one recess is a V shape, an arc, a polygon, or a combination thereof.

5. The light guide plate of claim 1, wherein the at least one recess comprises a sidewall and a bottom portion, and an angle between the sidewall and the bottom portion is greater than or equal to 90 degrees.

6. The light guide plate of claim 5, wherein the bottom portion of the at least one recess is coplanar with the light emitting surface.

7. The light guide plate of claim 5, wherein an angle between the sidewall of the at least one recess and a normal to the second light incident surface is substantially from 10 degrees to 20 degrees.

8. The light guide plate of claim 1, wherein the at least one recess comprises a plurality of recesses formed between the inclined light guide portions, and every two adjacent recesses are spaced apart by a distance.

9. The light guide plate of claim 1, wherein the at least one recess comprises a plurality of recesses formed between the inclined light guide portions, and every two recesses arranged side-by-side form a group, and every two adjacent groups are spaced apart by a distance.

10. The light guide plate of claim 1, wherein the at least one recess comprises a plurality of recesses formed between the inclined light guide portions, and every three recesses arranged side-by-side form a group, and every two adjacent groups are spaced apart by a distance.

11. The light guide plate of claim 1, wherein the at least one recess comprises a plurality of recesses formed between the inclined light guide portions arranged side-by-side.

12. The light guide plate of claim 1, wherein the first end surface is a second light incident surface connected to the first light incident surface.

13. The light guide plate of claim 12, wherein a sum of heights of the first light incident surface and the second light incident surface is approximately equal to a height of a light source.

14. The light guide plate of claim 1, wherein a sum of the heights of the first light incident surface, the second light incident surface and the first end surface is approximately equal to a height of a light source.

15. The light guide plate of claim 1, wherein a sum of the heights of the first light incident surface and the second light incident surface is approximately equal to a height of a lighting portion of the light source.

16. The light guide plate of claim 1, wherein the first end surface is elevated higher than the lighting portion of the light source.

17. A light guide plate, comprising:
a main body portion having a first light incident surface a bottom surface adjacent to the first light incident, surface, and a light emitting surface opposite to the bottom surface;
a plurality of inclined light, guide portions disposed above the main body portion, each of the inclined light guide portions having a first end surface connected to the first light incident surface and an inclined surface connected to the light emitting surface of the main body portion, and at least one recess formed between the inclined light guide portions;
a wedge-shaped light guide portion formed between the inclined light guide and the main body portion: and
a horizontal connecting portion horizontally extending from the first light incident surface, the second light incident surface and the first end surface toward the light source.

18. A backlight assembly, comprising:
a light guide plate comprising:
  a main body portion having a first light incident surface, a bottom surface adjacent to the first light incident surface, and an light emitting surface opposite to the bottom surface; and
  a plurality of inclined light guide portions disposed above the main body portion, each of the inclined light guide portions having a first end surface connected to the first light incident surface and an inclined surface connected to the light emitting surface of the main body portion, and at least one recess formed between the inclined light guide portions; and
  a wedge-shaped light guide portion formed between the inclined light guide portions and the main body portion, wherein the wedge-shaped light guide portion further comprises a second light incident surface between the first light incident surface and the first end surface;
a light source disposed adjacent to the first light incident surface of the light guide plate;
an optical film set disposed adjacent to the light emitting surface of the main body portion of the light guide plate; and
a reflector disposed adjacent to the bottom surface of the main body portion of the light guide plate.

19. The backlight assembly of claim 18, wherein the light source includes a point light source and the recess is formed corresponding to the light source.

20. The backlight assembly of claim 18, wherein the light source includes a point light source being formed corresponding to one of the inclined light guide portions.

21. The backlight assembly of claim 18, wherein a shape of the at least one recess is a V shape, an arc, a polygon, or a combination thereof.

22. The backlight assembly of claim 18, wherein the at least one recess comprises a sidewall and a bottom portion, and an angle between the sidewall and the bottom portion is greater than or equal to 90 degrees.

23. The backlight assembly of claim 22, wherein an angle between the sidewall of the at least one recess and a normal to the second light incident surface is substantially from 10 degrees to 20 degrees.

24. The backlight assembly of claim 18, wherein the at least one recess comprises a plurality of recesses formed between the inclined light guide portions, and every two adjacent recesses are spaced apart by a distance.

25. The backlight assembly of claim 18, wherein the at least one recess comprises a plurality of recesses formed between the inclined light guide portions, and every two recesses arranged side-by-side form a group, and every two adjacent groups are spaced apart by a distance.

26. The backlight assembly of claim 18, wherein the at least one recess comprises a plurality of recesses formed between the inclined light guide portions, and three recesses arranged side-by-side form a group, and every two adjacent groups are spaced apart by a distance.

27. The backlight assembly of claim 18, wherein the at least one recess comprises a plurality of recesses formed between the inclined light guide portions arranged side-by-side.

28. The backlight assembly of claim 18, wherein the first end surface is a second light incident surface connected to the first light incident surface.

29. The backlight assembly of claim 28, wherein a sum of heights of the first light incident surface and the second light incident surface is approximately equal to a height of a light source.

30. The backlight assembly of claim 18, wherein a sum of the heights of the first light incident surface, the second light incident surface and the first end surface is approximately equal to a height of a light source.

31. The backlight assembly of claim 18, wherein a sum of the heights of the first light incident surface and the second light incident surface is approximately equal to a height of a lighting portion of the light source.

32. The backlight assembly of claim 18, wherein the first end surface is elevated higher than the lighting portion of the light source.

33. The backlight assembly of claim 18, further comprising a horizontal connecting portion horizontally extending from the first light incident surface, the second light incident surface and the first end surface toward the light source.

* * * * *